(12) United States Patent
Gruber

(10) Patent No.: US 8,724,267 B2
(45) Date of Patent: May 13, 2014

(54) CIRCUIT ARRANGEMENT AND METHOD FOR SIMULATING A SENSOR

(75) Inventor: Paul Gruber, Paderborn (DE)

(73) Assignee: Dspace Digital Signal Processing and Control Engineering GmbH, Paderborn (DE)

( * ) Notice: Subject to any disclaimer, the term of this patent is extended or adjusted under 35 U.S.C. 154(b) by 461 days.

(21) Appl. No.: 13/197,047

(22) Filed: Aug. 3, 2011

(65) Prior Publication Data

US 2012/0033337 A1    Feb. 9, 2012

(30) Foreign Application Priority Data

Aug. 4, 2010  (DE) .................... 10 2010 033 433

(51) Int. Cl.
*H02H 9/00* (2006.01)
(52) U.S. Cl.
USPC ............................................................ 361/56
(58) Field of Classification Search
USPC ............................................................ 361/56
See application file for complete search history.

(56) References Cited

U.S. PATENT DOCUMENTS

| | | | | |
|---|---|---|---|---|
| 3,784,843 A | * | 1/1974 | Gustus | 307/117 |
| 4,050,017 A | * | 9/1977 | Paufve | 324/72.5 |
| 5,153,499 A | * | 10/1992 | Klesh | 323/280 |
| 5,381,082 A | * | 1/1995 | Schlicht | 323/280 |
| 5,465,041 A | | 11/1995 | Sanders et al. | |
| 7,137,645 B2 | * | 11/2006 | Schumacher et al. | 280/735 |
| 2006/0033614 A1 | | 2/2006 | Kleen et al. | |

FOREIGN PATENT DOCUMENTS

| | | |
|---|---|---|
| DE | 69430689 T2 | 1/2003 |
| DE | 102004039518 A1 | 2/2006 |
| DE | 202005016316 U1 | 3/2006 |

OTHER PUBLICATIONS

German Patent and Trademark Office, Search Report in German Patent Application No. DE 10 2010 033 433 (Sep. 15, 2011).
Catalog, dSPACE, Paderborn, Germany, p. 521, 2009.

* cited by examiner

*Primary Examiner* — Stephen W Jackson
(74) *Attorney, Agent, or Firm* — Leydig, Voit & Mayer, Ltd.

(57) ABSTRACT

A circuit arrangement for simulating a sensor includes two external connections configured to change at least one of a current intensity and a resistance between the two external connections as a function of a measured variable. The circuit arrangement comprises: (a) a current path connecting the two external connections having two field-effect transistors and a resistor, and (b) a circuit configured to actuate gates of the two field-effect transistors so as to at least one of control and regulate a current through the current path, wherein the resistor is configured as a shunt resistor connected to a bridge rectifier and the circuit configured to actuate the gates of the two field-effect transistors comprises a control circuit configured to detect and regulate the current in the current path via a voltage drop at the shunt resistor.

21 Claims, 2 Drawing Sheets

CIRCUIT ARRANGEMENT AND METHOD FOR SIMULATING A SENSOR

CROSS-REFERENCE TO RELATED APPLICATIONS

This is application claims benefit of priority under 35 U.S.C. §119 of German Application No. 10 2010 033 433.2, filed Aug. 4, 2010, and which is hereby incorporated by reference herein.

FIELD

The invention relates to a circuit arrangement for simulating a sensor that has two external connections and that changes the current intensity and/or the resistance between these connections as a function of a variable that is to be measured.

BACKGROUND

Circuit arrangements for simulating sensors that change their current intensity and/or their resistance between a signal connection terminal (often referred to as a signal pin) and a reference voltage connection terminal (often referred to as a reference pin) as a function of a variable that is to be measured are needed, for example, in the pre-development stage of control devices for vehicle components of motor vehicles. Such a control device can be, for example, the control device of a combustion engine, and the sensor to be simulated can be, for example, a wheel-speed sensor of the type Bosch DF11s that changes its current intensity and/or resistance as a function of the speed.

The circuit arrangement is incorporated into a simulator device and it constitutes a current drain. Such circuit arrangements are known as "sensor simulation boards" for HiL applications (HiL: hardware-in-the-loop) or, in cases where these circuit arrangements are used exclusively as a current drain, they are also often referred to as a "current sink".

SUMMARY

In an embodiment, the present invention provides a circuit arrangement for simulating a sensor including first and second external connections configured to change at least one of a current intensity and a resistance between the two external connections as a function of a measured variable. The circuit arrangement includes a current path connecting the external connections and having first and second field-effect transistors and a resistor connected therein. The circuit arrangement further includes a circuit configured to actuate gates of the field-effect transistors so as to at least one of control and regulate a current through the current path. The resistor is configured as a shunt resistor connected to a bridge rectifier and the circuit configured to actuate the gates of the field-effect transistors includes a control circuit configured to detect and regulate the current in the current path via a voltage drop at the shunt resistor.

BRIEF DESCRIPTION OF THE DRAWINGS

The invention will be explained in greater detail below making reference to the accompanying drawings on the basis of a preferred embodiment. The following is shown.

DETAILED DESCRIPTION

Figure 1:
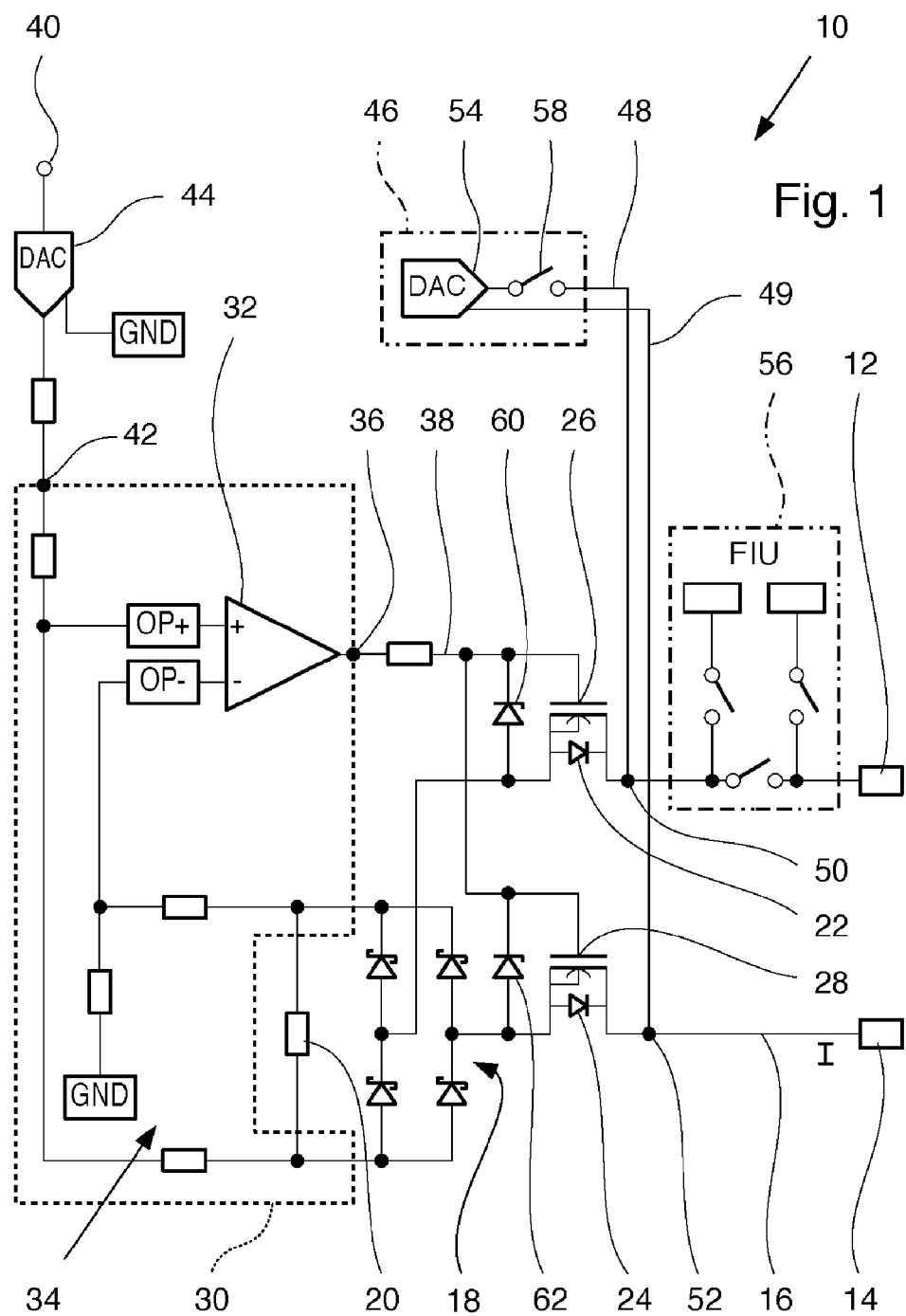
FIG. 1 is a diagram of a circuit arrangement according to a preferred embodiment of the invention.

Embodiments of the invention provide a circuit arrangement that is simple, inexpensive, precise and that is protected against polarity reversal. Corresponding method and a simulator device are also provided.

In an embodiment, the invention relates to a circuit arrangement for simulating a sensor that has two external connections and that changes the current intensity and/or the resistance between these connections as a function of a variable that is to be measured. The circuit arrangement includes a current path which connects the two connections and in which two field-effect transistors and a resistor are arranged, as well as a circuit that actuates the gates of the transistors for purposes of controlling and/or regulating the current through the current path. Embodiments of the invention also relate to a corresponding method and to a simulator device having such a circuit arrangement.

In the circuit arrangement according to the invention, it is provided that the resistor is configured as a shunt resistor that is interconnected in a bridge rectifier, and the circuit is a control circuit that detects and regulates the current in the current path via the voltage that is dropping at the shunt resistor. Such a circuit arrangement forms a bipolar current sink with a wide operating range (current range and/or voltage range and/or resistance range) that can be created with just a few standard components. This is especially advantageous in the case of a circuit arrangement that is supposed to simulate not only one single sensor but rather numerous sensors. A typical number n of sensors to be simulated in such a circuit arrangement is $2 \leq n \leq 50$. This number depends especially on the type and complexity of the system that is to be simulated. For example, it can also be provided that, for simulation scenarios, the majority of the sensor signals are supplied by "real" sensors and, for example, only one or two sensor signal(s) are supplied by a sensor simulation using one or two circuit arrangement(s) of the type according to the invention.

Within the scope of the invention, a shunt resistor is to be understood as an electric resistor that is used for measurement and/or regulation purposes, whereby a voltage drop that is caused by the current flow through the shunt resistor is evaluated.

The current path of the circuit arrangement leads from one of the external connections via the first of the field transistors and via a first part of the bridge rectifier to the shunt resistor, and from there, via a second part of the bridge rectifier and via the second of the field transistors, to the other one of the external connections. Since the circuit arrangement constitutes a bipolar current sink, different partial paths arise within the parts of the bridge rectifier, depending on the direction of the current.

This yields the following advantages: a simplification of the circuit arrangement for simulator devices, thereby reducing the space requirement, the component costs, the current consumption and the configuration effort. The circuit arrangement functions bidirectionally, and regulates the magnitude of the current in this process.

The circuit arrangement is preferably included inside a simulator device, especially included inside an HiL simulator (HiL: hardware-in-the-loop). The term "hardware-in-the-loop" refers to a method in which an embedded system (for example, a real electronic control device or a real mechatronic component) is connected via its inputs and outputs to an adapted counter-piece that is generally called an HiL simulator and that serves to replicate the real environment of the system.

According to an advantageous embodiment of the invention, it is provided that the control circuit has an operational amplifier whose output is connected to the gates of both transistors via a branched current path. In particular, it is provided that the control circuit is realized by a measuring bridge (as a measuring unit of the control circuit) having the shunt resistor and by the operational amplifier.

According to another advantageous embodiment of the invention, it is provided that the control circuit has an input for a specifiable setpoint signal as the reference variable for the regulation. This reference variable indicates a setpoint current intensity through the current path.

In particular, it is provided that the circuit arrangement has a digital-analog transducer (DA-transducer or DAC: Digital-Analog Converter) at the input of the control circuit. Consequently, the setpoint signal can be specified as a digital signal. This signal is converted by means of the DA transducer into a specifiable setpoint voltage.

It is advantageously provided that the field-effect transistors are configured as MOSFETs (Metal Oxide Semiconductor Field-Effect Transistors).

According to an advantageous refinement of the invention, the bridge rectifier has Schottky diodes.

According to another advantageous refinement of the invention, a failure insertion unit (FIU) is arranged in the current path between one of the connections and the transistor facing this connection. Such a unit is available on the market in the form of a module. The failure insertion unit can simulate typical errors in a control device, namely, (i) especially a short circuit against the ground, (ii) a short circuit against the supply voltage, (iii) a short circuit against any other line that especially carries another signal, and (iv) a complete or partial contact loss, i.e. especially the interruption of a signal line or a so-called contact bounce, which can lead to an unwanted modulation.

According to an advantageous embodiment of the invention, the circuit arrangement also has a voltage source and feed paths that connect the voltage source to a first feed point and to a second feed point, whereby the first feed point is arranged in the current path between the one connection and the one transistor, while the second feed point is arranged in the current path between the second connection and the second transistor. In particular, it is provided that the additional voltage source is another digital-analog transducer or has another digital-analog transducer. Preferably, it is also provided that at least one of the feed paths has at least an additional switching element so that said path can be interrupted in a controlled manner.

The simulator device according to the invention has at least one above-mentioned circuit arrangement for simulating a sensor that has two external connections and that changes its current intensity and/or its resistance as a function of a variable that is to be measured, and said simulator device has a control unit that specifies a setpoint voltage to the circuit arrangement. The control unit is especially computer-based. Preferably, the simulator device is an HiL simulator (HiL: hardware-in-the-loop). Advantageously, the sensor to be simulated is an active sensor.

The invention also relates to the use of an above-mentioned simulator device in order to test control devices, especially control devices for motor vehicles.

Finally, the invention relates to a method for simulating a sensor that has two external connections and that changes the current intensity and/or the resistance between these connections as a function of a variable that is to be measured, which is done by means of a circuit arrangement having (a) a current path that connects the two connections in which two field-effect transistors and a resistor are arranged, and having (b) a circuit that actuates the gates of the transistors for purposes of controlling and/or regulating the current through the current path. According to the invention, it is provided that the resistor is configured as a shunt resistor that is incorporated in a bridge rectifier, and the circuit is a control circuit that detects and regulates the current in the current path via the voltage that is dropping at the shunt resistor.

FIG. 1 shows a circuit arrangement 10 for simulating a sensor that has two external connections 12, 14 and that changes the current intensity and/or the resistance between these connections as a function of a variable that is to be measured. Aside from the connections 12, 14, the circuit arrangement 10 also has a current path 16 that connects these two connections 12, 14, said current path 16 having a shunt resistor 20 that is interconnected in a bridge rectifier 18, and two essentially identical field-effect transistors 22, 24 encompassing the bridge rectifier 18 in the current path 16. The shunt resistor 20 is a resistor at which a voltage that is proportional to the current I in the current path can be picked up over the entire working range of the simulation of the circuit arrangement 10. The transistors 22, 24 are MOSFETs whose sources and drains are interconnected in opposite directions in the current path 16 with respect to each other.

The current path 16 leads from one of the external connections 12 via the first of the field-effect transistors 22 and via a first part of the bridge rectifier 18 to the shunt resistor 20, and from there, via a second part of the bridge rectifier 18 and via the second of the field-effect transistors 24, to the other of the external connections 14. Since the circuit arrangement 10 is a bipolar current sink, depending on the current direction, this results in different partial paths within the parts of the bridge rectifier 18.

The circuit arrangement 10 also has a control circuit 30 that actuates the gates 26, 28 of the transistors 22, 24 for purposes of controlling the current I through the current path 16. The central component of this control circuit 30 is an operational amplifier 32. For control purposes, the shunt resistor 20 is interconnected in a measuring unit (measuring bridge) 34 of this control circuit 30. The control circuit 30 uses its measuring unit 34 to detect the current I in the current path 16 via the voltage that is dropping at the shunt resistor 20, and it regulates this current I in accordance with a specifiable setpoint signal. For this purpose, the output 36 of the operational amplifier 32 is connected via a branched current path 38 to the gates 26, 28 of both transistors 22, 24. This output 36 is, at the same time, the output of the control circuit 30. The operational amplifier 32 has a power supply unit.

In order to receive the setpoint signal, the circuit arrangement 10 has an input 40 for a specifiable setpoint signal as the reference variable for the regulation. This input 40 of the circuit arrangement 10 shown in FIG. 1 is an input for a digital signal so that a digital-analog transducer 44 (DAC) is interconnected between this input 40 of the circuit arrangement 10 and an input 42 of the control circuit 30. Preferably, the voltage present at the input 42 is associated with the ground potential (GND).

Furthermore, the circuit arrangement 10 optionally has an additional voltage source 46 that is electrically connected via feed paths 48, 49 to feed points 50, 52 in the current path 16. A first feed path 48 leads from the additional voltage source 46 to a first feed point 50, while a second feed path 49 leads to a second feed point 52, whereby the first feed point 50 is arranged in the current path 16 between the one connection 12 and the one transistor 22, while the second feed point 52 is arranged in the current path 16 between the second transistor 24 and the second connection 14. The voltage source 46 is an actuatable voltage source and it has another digital-analog transducer 54.

Furthermore, a failure insertion unit 56 (FIU) is arranged in the current path 16 between one of the connections 12 and the transistor 26 facing this connection 12 (more precisely, between one of the connections 12 and the feed point 50 facing this connection 12).

The following functional relationships arise as well as the resultant functions.

The circuit arrangement 10 functions as a bidirectional current sink between the connections 12, 14 with two transistors 22, 24 that are interconnected in opposite directions in series. The shunt resistor 20 is located between them. The shunt resistor 20 is incorporated in the bridge rectifier 18. The control circuit 30 that comprises an operational amplifier 232 measures the voltage via the shunt resistor 20, and sets the magnitude of the current I through the shunt resistor 20. The setpoint value for the current regulation is specified via an analog voltage that is prescribed by the digital-analog transducer 44. The bridge rectifier 18 only carries the voltage via the shunt resistor 20, not that of the entire current sink. Thus, in the bridge rectifier 18, Schottky diodes with a lower reverse voltage and thus also a lower conducting-state voltage can be used in the bridge rectifier 18.

Actually, only one unidirectional current sink is needed for each sensor that is to be simulated. Depending on the sensor, a certain current has to be either dissipated to the ground by a control device, or else conducted by a positive voltage to the control device. In order to include the connection 12 in an FIU 56 in both cases, one would need either two FIU channels, that is to say, three additional relays plus actuation units and software for each current sink, or else a bipolar current sink whose utilized direction also has to be configured in the software by changing the setpoint value.

In the circuit arrangement 10, preferably only one connection 12 of the current sink (called a signal pin) is provided with an FIU 56, while the other connection 14 (called a reference pin) is interconnected in the cable assembly between the control device and the simulator device (see FIG. 2) permanently to the ground, the supply voltage or, in some cases, with another potential, depending on the sensor that is to be simulated. No additional effort for setting or specifying the signal direction is necessary in the FIU 56 or in the setpoint value specification.

The employed control circuit (operational circuit—OP) 30 can be operated without electrical isolation for most working voltage ranges that are normally required by users. In the case of different common-mode voltages, the current through the resistors via which the shunt resistor 20 is interconnected to the control circuit causes distortions of the current through the signal pin (connection 12) in the measuring unit 34 of the control circuit 30. However, for the two above-mentioned circuits, this can theoretically be almost completely compensated for by means of the hardware. This is done here by a resistor at the output of the one digital-analog transducer 44.

Optionally, the current sink can share its outputs 12, 14 and optionally also the FIU 56 with another signal generator or with the additional voltage source 46, for example, with the additional digital-analog transducer (DAC) 54 with a voltage output. Preferably, at least one of the two field-effect transistors 22, 24 is put into a blocking state for the activation time of the additional voltage source 46 or of the additional digital-analog transducer 54, as a result of which the additional voltage source 46 acts directly onto the external connections 12, 14 and no current flows away from the additional voltage source 46 via the shunt resistor 20. The additional voltage source 46 can either be isolated from at least one external connection 12, 14 or connected to it by means of another switching element 58, for example, a switching transistor.

The source of each of the two field-effect transistors 22, 24 is preferably electrically connected to the associated gate 26, 28 of this field-effect transistor 22, 24 via an external path having a Zener diode 60, 62. These Zener diodes 60, 62 serve to protect the field-effect transistors 22, 24, especially against excessive gate-source voltages that can be caused, for example, by incorrect wiring before the start-up of the circuit arrangement 10 or by its improper use.

Figure 2:
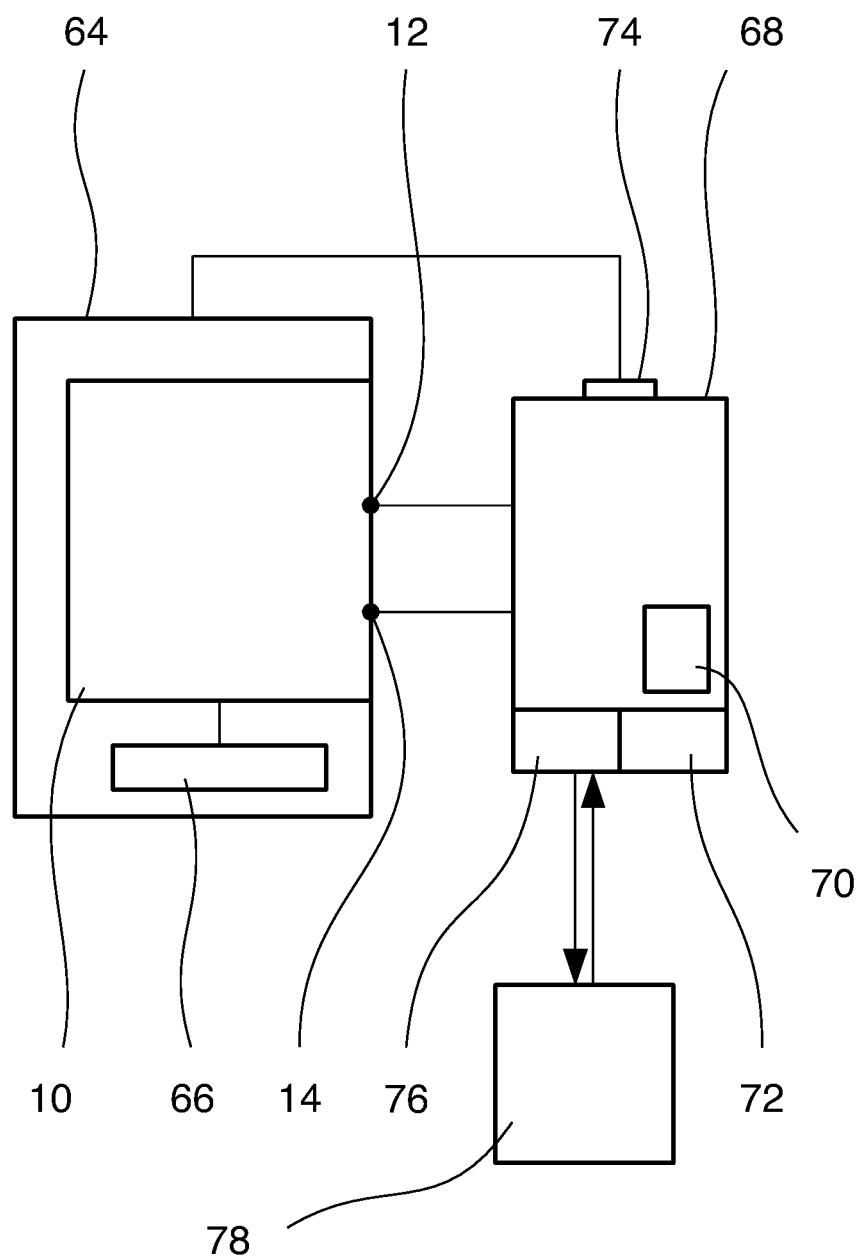
FIG. 2 is a schematic representation of a simulator device configured as an HiL simulator having a circuit arrangement according to a preferred embodiment of the invention.

FIG. 2 shows a schematic representation of the simulator device 64 configured as an HiL simulator with the circuit arrangement 10 and with a control unit 66 that enters a setpoint voltage to the control circuit 30 via the digital-analog transducer 44, and this setpoint voltage specifies the current I that is to be regulated through the current path.

Via the two connections 12, 14 (signal pin 12 and reference pin 16), the simulator device 64 is connected to a control device 68 (ECU) that is configured as a motor control device of an internal-combustion engine and it simulates a sensor for this control device 68.

The control device 68 has a microcontroller 70, a power supply unit 72 and at last one, but preferably several, interface(s) 74, 76. Via one of these interfaces 74, the simulator device 64 is connected by means of signals to the control device 68 in order to simulate additional input variables of the control device 68. Preferably, via at least one additional interface 76, the control device 68 is connected by means of signals to a system 78 that is to be controlled or regulated.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE NUMERALS 10 circuit arrangement
12 connection
14 connection
16 current path
18 bridge rectifier
20 shunt resistor
22 field-effect transistor
24 field-effect transistor
26 gate
28 gate
30 control circuit
32 operational amplifier
34 measuring unit
36 output
38 branched current path
40 input
42 input
44 digital-analog transducer, also called "digital-analog converter" or "DAC"
46 voltage source
48 first feed path
49 second feed path
50 feed point
52 feed point
54 additional digital-analog transducer
56 failure insertion unit
58 additional switching element
60 Zener diode
62 Zener diode
64 simulator device
66 control unit
68 control device
70 microcontroller
72 power supply unit
74 interface
76 interface
78 system
I current

What is claimed is:

1. A circuit arrangement for simulating a sensor including first and second external connections configured to change at least one of a current intensity and a resistance between the two external connections as a function of a measured variable, said circuit arrangement comprising:
a current path connecting the external connections and having first and second field-effect transistors and a resistor connected therein; and
a circuit configured to actuate gates of the field-effect transistors so as to at least one of control and regulate a current through the current path,
wherein the resistor is configured as a shunt resistor connected to a bridge rectifier and the circuit configured to actuate the gates of the field-effect transistors comprises a control circuit configured to detect and regulate the current in the current path via a voltage drop at the shunt resistor.

2. The circuit arrangement according to claim 1, wherein the control circuit further comprises an operational amplifier having an output connected to the gates of the field-effect transistors via a branched current path.

3. The circuit arrangement according to claim 1, wherein the control circuit includes an input configured to accept a predetermined setpoint signal as a reference variable for the regulation.

4. The circuit arrangement according to claim 2, wherein the control circuit includes an input configured to accept a predetermined setpoint signal as a reference variable for the regulation.

5. The circuit arrangement according to claim 3 further comprising a digital-analog transducer connected to the input of the control circuit.

6. The circuit arrangement according to claim 1, wherein the field-effect transistors are configured as MOSFETs.

7. The circuit arrangement according to claim 1, wherein the bridge rectifier includes Schottky diodes.

8. The circuit arrangement according to claim 1 further comprising a failure insertion unit connected in the current path between at least one of the external connections and a corresponding one of the field-effect transistors facing the at least one of the external connections.

9. The circuit arrangement according to claim 1 further comprising a voltage source having feed paths connecting the voltage source to a first feed point and to a second feed point, the first feed point being connected in the current path between the first external connection and the first field-effect transistor, and the second feed point being connected in the current path between the second external connection and the second field-effect transistor.

10. The circuit arrangement according to claim 9, wherein the voltage source includes a digital-analog transducer.

11. The circuit arrangement according to claim 9, wherein at least one of the feed paths is connected to a switching element.

12. The circuit arrangement according to claim 10, wherein at least one of the feed paths is connected to a switching element.

13. A simulator device configured to simulate a sensor including first and second external connections and to change at least one of a current intensity and resistance as a function of a measured variable, the simulator device comprising:
a circuit arrangement comprising a current path connecting the external connections having first and second field-effect transistors and a resistor, and a circuit configured to actuate gates of the field-effect transistors so as to at least one of control and regulate a current through the current path, wherein the resistor is configured as a shunt resistor connected to a bridge rectifier and the circuit configured to actuate the gates of the field-effect transistors comprises a control circuit configured to detect and regulate the current in the current path via a voltage drop at the shunt resistor; and
a control unit configured to specify a setpoint signal to the circuit arrangement.

14. The simulator device according to claim 13, wherein the simulator device is an HiL simulator.

15. The simulator device according to claim 13, wherein the sensor is an active sensor.

16. The simulator device according to claim 14, wherein the sensor is an active sensor.

17. The simulator device according to claim 13, wherein the sensor is configured to provide input to a control device so as to test a control device.

18. The simulator device according to claim 17, wherein the control device is a motor vehicle control device.

19. The simulator device according to claim 15, wherein the sensor is configured to provide input to a control device so as to test a control device.

20. The simulator device according to claim 19, wherein the control device is a motor vehicle control device.

21. A method for simulating a sensor including first and second external connections configured to change at least one of a current intensity and a resistance between the two external connections as a function of a measured variable, the method comprising:
- connecting, via a current path, the external connections having first and second field-effect transistors and a resistor connected therein; and
- actuating, via a circuit, gates of the field-effect transistors so as to at least one of control and regulate a current through the current path, wherein the resistor is configured as a shunt resistor incorporated in a bridge rectifier and the circuit comprises a control circuit configured to detect and regulate the current in the current path via a voltage drop at the shunt resistor.

\* \* \* \* \*